June 24, 1969  C. R. BARNES  3,451,531
AUTOMATIC HIGH-SPEED OUTLET
Filed Aug. 16, 1967
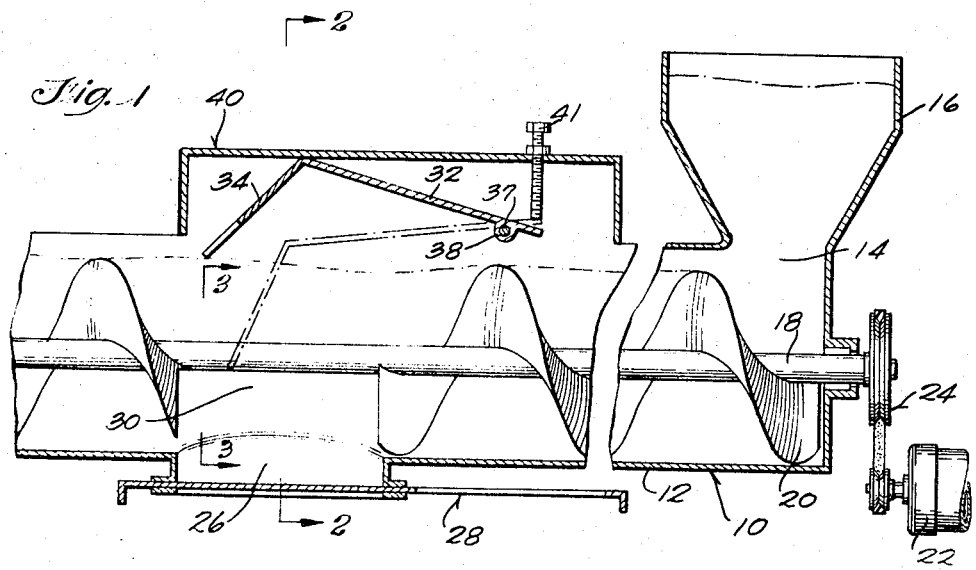
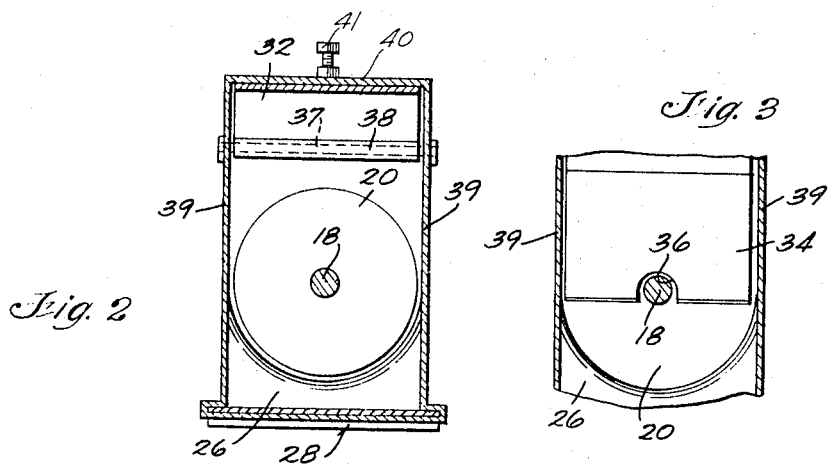
Inventor
Clyde R. Barnes
By
Whaley, Whaley, House & Clemency
Attorneys United States Patent Office 3,451,531
Patented June 24, 1969

3,451,531
AUTOMATIC HIGH SPEED OUTLET
Clyde R. Barnes, Ossian, Ind., assignor to Mix-Mill, Inc., Bluffton, Ind., a corporation of Indiana
Filed Aug. 16, 1967, Ser. No. 661,111
Int. Cl. B65g *33/14*
U.S. Cl. 198—213          7 Claims

ABSTRACT OF THE DISCLOSURE

An auger conveyor having an intermediate outlet is provided with a deflector plate pivotally mounted to the auger housing to deflect grain or other conveyed material into the intermediate outlet. Removal of a portion of the auger flight above the intermediate outlet permits movement of the deflector close to the auger shaft to prevent carry-over of material past the open outlet during high conveying speeds. When the outlet is closed the conveyed material pushes the deflector plate to a retracted position outside the main conveyor tube.

Background of invention

In the use of large diameter auger conveyors such as industrial type conveyors in which a large volume of material is conveyed at a relatively slow lateral speed through the conveyor, removal of the material from the conveyor through secondary or intermediate outlets is accomplished without difficulty. However, when a large volume of material is conveyed at a higher lateral speed through small diameter screw conveyors such as those typically used on the farm, problems are encountered in removal of the conveyor material through intermediate outlets due to carry-over of the material past the outlet by the auger flight and auger shaft.

Summary of invention

The invention contemplates the use of a free-swinging deflector located within the auger conveyor housing and above an intermediate outlet to prevent carry-over of material past the intermediate outlet by the auger flighting and auger shaft. A portion of the auger flight is removed in the zone over the outlet to permit movement of the deflector close to the auger shaft. When the intermediate outlet is closed, pressure from the auger and conveyed material easily displaces the free-swinging deflector from the path of the conveyed material into a housing, the deflector offering little or no resistance to the movement of grain or the like through the conveyor.

An adjustable stop is provided to limit pivotal movement of the deflector toward the auger shaft and prevent engagement of the lower edge of the deflector with the auger shaft.

The use of the deflector permits movement of large volumes of material through a small diameter auger conveying system at high velocity and effective removal of grain at an intermediate outlet. The removal of a portion of the flighting does not cause any loss in conveying speed since the conveyed material is pushed in the form of a plug past the closed intermediate outlet.

Further objects and advantages of the invention will become apparent from the following disclosure.

Drawings

FIGURE 1 is a vertical sectional view of a portion of an auger conveying system embodying the present invention.

FIGURE 2 is a sectional view along line 2—2 of FIGURE 1.

FIGURE 3 is a fragmentary sectional view along line 3—3 of FIGURE 1.

Detailed description

Referring to FIGURE 1 there is shown a portion of an auger conveying system which is generally designated 10 and which includes an auger housing 12 having an inlet 14 with a material feeding hopper 16 located above the inlet 14. Within the auger housing is an auger shaft 18 having auger flighting 20. The auger shaft 18 is conventionally driven by a motor 22 through a drive train 24. For removal of grain or the like to fill intermediate bins, the auger housing 12 is provided with an intermediate or secondary outlet 26 having a slide valve 28 which can be remotely controlled by cables.

In accordance with the invention a portion of the auger flight 20 is removed in the region or zone 30 above the outlet 26. Located within the auger housing and within zone 30 is a deflector plate 32 which has an obliquely downward extending end portion 34 which is provided with a notch 36 (FIGURE 3) in the lower edge which receives the auger shaft 18 when the deflector is in its lowermost portion shown in broken lines in FIGURE 1. The deflector plate 32 is pivotally supported by a pin or bolt 37 carried by the housing wall 39 which extends through a sleeve or eye 38 located on the deflector plate 32 near one end thereof. The outlet 26 is preferably located beneath the deflector plate 32 and the deflector plate 32 is gravity biased toward the outlet 26. The wall 39 forms an upper enclosure 40 substantially completely above the auger tube 12 to receive deflector plate 32.

Adjustable stop means 41 are provided to limit pivotal movement of the deflector 32 to afford spacing of the deflector from the auger shaft 18 as shown in FIGURE 3 to prevent wear of the deflector plate.

In operation of the conveying system 10 auger pressure and movement of conveyed material will pivot or displace the deflector 32 to the position shown in full lines in FIGURE 1. When valve plate 28 is opened for removal of material through intermediate outlet 26 the deflector 32 will assume the position shown in broken lines in FIGURE 1 and in FIGURE 3 with the deflector plate straddling the auger shaft 18 as the pressure on the deflector is removed as a result of flow of conveyed material into the outlet 26. The deflector will guide the conveyed material into the intermediate outlet when in this position. The narrow spacing between the auger shaft 18 and the end portion 34 prevents material travel along the auger shaft 18. Although a single intermediate outlet is shown for illustration, the structure may be duplicated at desired locations along a conveyor. Thus, with the use of the deflector, high speed conveying of material with selective discharge through intermediate outlets can be accomplished without passage of substantial amounts of material past the intermediate outlets.

I claim:

1. In an auger conveying system including an auger housing, inlet and outlet ends of said auger housing, an outlet intermediate said ends, a valve for selectively opening and closing said outlet, and an auger shaft provided with an auger flight, the improvement in combination therewith comprising said shaft being without an auger flight at said intermediate outlet, a deflector plate pivotally mounted to said auger housing for free-swinging movement about an axis transverse to the axis of said auger shaft, said deflector plate being biased toward said intermediate outlet adjacent the portion of said shaft without auger flights to deflect conveyed material into said intermediate outlet when said valve is open, said deflector plate being moved from the path of conveyed material solely in response to pressure of conveyed material when said valve is closed.

2. The device of claim 1 wherein said deflector plate has an end portion extending downwardly and obliquely from said deflector plate toward said auger shaft.

3. The device of claim 2 wherein said end portion has a lower edge with a notch larger in diameter than said auger shaft, said notch being aligned to receive said auger shaft when said deflector is in the path of conveyed material.

4. The device of claim 1 including an adjustable stop to limit downward pivotal movement of said deflector plate.

5. The device of claim 1 wherein said deflector plate has an eye spaced intermediate the ends of said plate, said eye receiving a bolt extending through said housing to pivotally support said deflector plate.

6. The device of claim 1 in which said housing is provided with an extension opposite said intermediate outlet adapted to receive said deflector plate, said extension housing being adapted to pivotally support said plate, and a stop mounted on said housing and externally adjustable to selectively limit downward pivotal movement of said deflector plate.

7. The device of claim 6 in which said intermediate outlet is at the bottom of said housing and said deflector plate is biased toward said intermediate outlet solely by gravity.

References Cited

UNITED STATES PATENTS

| 311,052 | 1/1885 | Anderson | 198—205 |
| 2,298,829 | 10/1942 | McCann | 198—66 |
| 2,988,203 | 6/1961 | Peterson | 198—213 |

FOREIGN PATENTS

| 699,962 | 11/1953 | Great Britain. |

RICHARD E. AEGERTER, *Primary Examiner.*

U.S. Cl. X.R.

198—64